US006672488B2

(12) United States Patent
de Pous

(10) Patent No.: US 6,672,488 B2
(45) Date of Patent: Jan. 6, 2004

(54) FIXING DEVICE FOR FIXING A DISPENSING UNIT ON A CONTAINER NECK

(75) Inventor: Olivier de Pous, Paris (FR)

(73) Assignee: Valois S.A., Le Neubourg (FR)

( * ) Notice: Subject to any disclaimer, the term of this patent is extended or adjusted under 35 U.S.C. 154(b) by 0 days.

(21) Appl. No.: 10/114,986

(22) Filed: Apr. 4, 2002

(65) Prior Publication Data

US 2002/0175192 A1 Nov. 28, 2002

Related U.S. Application Data

(60) Provisional application No. 60/291,025, filed on May 16, 2001.

(30) Foreign Application Priority Data

Apr. 4, 2001 (FR) .......................................... 01 04595

(51) Int. Cl.[7] .......................... B65D 88/54; G01F 11/06
(52) U.S. Cl. ..................................... 222/321.9; 222/385
(58) Field of Search ........................... 222/321.7, 321.9, 222/383.1, 385

(56) References Cited

U.S. PATENT DOCUMENTS 4,773,553 A * 9/1988 Van Brocklin .............. 215/272
5,642,908 A * 7/1997 Mascitelli .............. 285/148.19
5,692,650 A 12/1997 Wolter et al.
5,772,080 A * 6/1998 de Pous et al. .......... 222/321.7
6,273,303 B1 * 8/2001 de Pous et al. .......... 222/402.1
6,463,650 B1 * 10/2002 Bougamont et al. .......... 29/453

FOREIGN PATENT DOCUMENTS

EP 0 707 895 A2 4/1996
FR 2 769 860 A 4/1999

* cited by examiner

*Primary Examiner*—Kevin Shaver
*Assistant Examiner*—Stephanie L Willatt
(74) *Attorney, Agent, or Firm*—Sughrue Mion, PLLC

(57) ABSTRACT

Fixing device for fixing a dispensing unit on a neck (30) of a container (3) defining an external wall (32), said device comprising:

a cladding hoop (2) defining an internal wall (22), and a fixing ring (1) forming receiving means (13) for holding the dispensing unit and a skirt (10) defining an internal wall (101), an external wall (102) and a free lower end (105), wherein said skirt further defined a first fixing area (103) at which its internal wall (101) is for engaging with the external wall (32) of the neck and a second locking area (104) at which its external wall is tightly engaged with the internal (22) of the cladding hoop, characterized in that the second locking area (104) is located under the first locking area (103), substantially at the lower end (105) of the skirt.

26 Claims, 2 Drawing Sheets

FIXING DEVICE FOR FIXING A DISPENSING UNIT ON A CONTAINER NECK

CROSS REFERENCE TO RELATED APPLICATION

This application claims the benefit under 35 U.S.C. §119 (e) of pending U.S. provisional patent application Serial No. 60/291,025, filed May 16, 2001, and priority under 35 U.S.C. §119(a)–(d) of French patent application No. FR-01.04595, filed Apr. 4, 2001.

TECHNICAL FIELD

The present invention relates to a fixing device for fixing a dispensing unit on a container neck defining an external wall. This type of fixing device, frequently used in the field of perfumery, cosmetics or even pharmacy, generally comprises a fixing ring forming receiving means for holding a dispensing unit such as a pump of a valve, and a skirt, the internal wall of which is intended to engage with the external wall of the container neck.

BACKGROUND OF THE INVENTION

A currently used technique consists in providing the internal wall of the skirt with one or more locking profiles which are accommodated under a shoulder formed by the external wall of the neck. These locking profiles may have the shape of snap-on heads positioned at the lower end of separate tabs; in this case, the skirt is slit in order to form tabs with the snap-on heads at their lower end. According to another technique, the snap-on profiles may assume the shape of a continuous internal peripheral fillet which protrudes inwards on the internal wall of the skirt. This fillet, like the snap-on heads, should, when mounting the ring on the neck of the container, pass over a thickened or reinforced edge of the neck below which is formed the shoulder with which the fillet or the heads cooperate. Consequently, the skirt momentarily (upon passing over the thickened edge) undergoes an outward radial deformation which increases its external diameter.

On the other hand, this type of fixing device also comprises a cladding hoop which will cover the ring, and more particularly the skirt, for an aesthetical, but also occasionally functional purpose. This is particularly the case when the skirt is made with separate tabs forming the internal snap-on heads. The hoop which will cover the skirt is then used as a blocking means in order to block the snap-on heads under the shoulder of the thickened edge of the neck.

The hoop cannot be mounted on the ring before the ring is mounted on the neck, since, as mentioned above, the tabs undergo a radial deformation outwards upon passing over the reinforced edge of the neck. By premounting the hoop on the ring, this outward radial deformation would not be possible without deforming or damaging the cladding hoop. Consequently, in this technique using tabs with snap-on heads, the hoop is only mounted on the ring as soon as the ring is mounted on the neck of the container.

In the other technique using an internal peripheral fillet, the skirt is also locally and momentarily radially deformed outwards upon passing over the reinforced edge. Consequently, neither it is possible to mount a cladding hoop on the ring; actually, in most cases, the cladding hoop is mounted on the ring, and more particularly on its skirt, through radial tightening from the tight contact between the internal wall of the hoop and the external wall of the ring. Consequently, the slightest deformation of the external wall of the skirt has the effect of deforming the hoop which is in tight contact with the skirt. Consequently, the hoop cannot be pre-mounted on the ring before mounting the ring on the neck, even with the continuous fillet technique. However, it may noted that the cladding hoop does not fulfil any function other than an aesthetical one in its fixing on the neck of the container with the technique of the continuous fillet which is itself sufficient for fixing the ring on the neck.

The problem of the premounting of the hoop on the ring provided with a continuous fillet was partly solved in document WO99/20401. In this document, a fixing device is described, comprising a cladding hoop and a fixing ring. The ring forms a skirt defining an internal wall provided with several locking profiles localized, distributed on the internal wall of the skirt. So this has nothing to do with a continuous fillet. However the skirt is not slit. To enable these point locking profiles to be radially deformed outwards upon passing over the thickened edge of the neck, corresponding neckings are provided, formed on the external wall of the skirt. Therefore, the skirt is not in contact with the internal wall of the hoop, but on the contrary defines several intermediate areas distributed on the external periphery of the skirt, at right angles to each locking profile, respectively, in order to allow a radial outward deformation of the skirt in these intermediate spaces without deforming or damaging the premounted cladding hoop. Indeed, in this document, the hoop is intended to be mounted on the ring before mounting the ring on the neck as the skirt may be radially deformed outwards in the intermediate spaces without deforming the hoop.

However, in this document the cladding hoop is provided in contact with the ring and more particularly with the skirt over the whole of its height, including the level where the skirt is in contact with the neck of the container. More specifically, between each intermediate space corresponding to a locking profile of the internal wall of the skirt, respectively, the external wall of the skirt is in tight contact with the internal wall of the hoop. Consequently, even if the skirt may be deformed radially outwards in the intermediate spaces, the fact remains at the least that the skirt is also deformed, even to a residual extent, at the level where the skirt is in tight contact with the hoop. As a result, the hoop is then slightly deformed, which leads to the very well known phenomenon of the deterioration or alteration of the cladding hoop's surface quality, especially in the case when the hoop is made in metal which is nearly always the case. This surface alteration phenomenon occurs as a flaking known as checking. This checking phenomenon is a very widespread problem and difficult to control on metal cladding hoops. Indeed, at the slightest deformation of the hoop, this checking phenomenon occurs at its external surface and obviously spoils its aesthetical appearance. In the case of the aforementioned prior art document, in which the hoop is in tight contact over the whole of the height of the ring, it is inevitable that the hoop is slightly deformed because of this radial tightening which tends to make it expand and thus causes the occurrence of this checking phenomenon.

BRIEF SUMMARY OF THE INVENTION

The object of the present invention is to find a remedy to these aforementioned drawbacks of the prior art by defining a fixing device with a cladding hoop and fixing ring, the cladding hoop of which does not undergo any substantial deformation which may cause the occurrence of this checking phenomenon, and this, while ensuring perfect fixing of the ring on the neck and of the hoop on the ring.

This object is achieved according to the invention by a fixing device for fixing a dispensing unit on a container neck defining an external wall, wherein said device comprises a cladding hoop defining an internal wall, and a fixing ring forms receiving means for holding the dispensing unit and a skirt defining an internal wall, an external wall and a free lower end, wherein said skirt further defines a first fixing area at which its internal wall is intended to engage with the external wall of the neck and a second locking area at which its external wall tightly engages with the internal wall of the cladding hoop, characterized in that the second locking area is located below the first fixing area, substantially at the lower end of the skirt.

Advantageously, an intermediate free space is formed between the skirt and the hoop at the first fixing area. Preferably, said intermediate space extends over the whole of the height of the skirt except at the second locking area. Thus, the cladding hoop is only in tight contact with the ring at the second locking area which is located at the free lower end of the skirt. Indeed, as this lower end of the skirt is free, it has less stiffness and support than its upper end connected to other portions of the ring. Therefore, this lower end is more easily deformable upon its radial tightening with the internal wall of the hoop. Further it should be noted that the locking of the hoop on the skirt only occurs at the end of the mounting operation, as the second locking area is located at the lower end of the skirt. Thus, the hoop does not undergo any type of contact elsewhere except in the area located at the height of the second locking area, which is advantageously placed at a height of the skirt which is the most able to deform plastically. Thus, the hoop cannot be deteriorated by a checking phenomenon, since, over the major portion of its height, it is not in contact with the ring, and is separated by an intermediate free space, and at the level where it is locked on the skirt, it is the latter which undergoes the radial inward deformation in order to generate the tight contact with the hoop. Thus, any deterioration by the checking phenomenon is prevented.

According to an embodiment, the second locking area has a greater external diameter than that of the first fixing area. Advantageously, an external outward shoulder connects the first area to the second area. The external wall of the skirt which advantageously forms the external wall of the ring, may thus comprise two cylindrical, advantageously circular, sections connected through an advantageously oblique shoulder, wherein the first cylindrical section extends on the major portion of the height of the skirt and has a smaller diameter than the second section which may also be cylindrical and circular and which is located at the lower end of the skirt.

According to another feature of the invention, the second locking area has a greater internal diameter than that of the first fixing area. Advantageously, an internal outward shoulder connects the first area to the second area. Thus, the internal wall of the skirt at the second locking area may serve as a guiding wall to facilitate the placing and fitting of the ring on the neck of the container. Preferably, the internal diameter of the ring at the second locking area is greater than the external diameter of the neck so that there is no tight contact between the second locking area and the neck after mounting the ring on the neck. Furthermore, the internal shoulder which is advantageously inclined, serves as convergency wall for guiding the neck up into the first fixing area of the skirt.

According to a feature of the invention, the external wall of the skirt at the second locking area is provided with deformable locking profiles against the internal wall of the hoop. In this case, the internal wall of the hoop may be in localized contact with the second locking area at the deformable locking profiles. Alternatively, the internal wall of the hoop is in continuous contact with the second locking area over the whole periphery. The external wall of the skirt at the second locking area may therefore be perfectly cylindrical, circular and smooth, or even be cylindrical, circular, but provided with a surface condition, for example as horizontal or vertical ribs or grooves, which promotes locking of the hoop.

According to another aspect of the invention, the internal wall of the skirt at the first fixing area is substantially cylindrical and has, before its mounting on the neck, an smaller internal diameter than the external diameter of the neck, so as to provide fixing through radial tightening. The wall of the skirt may be perfectly cylindrical, circular and smooth. Alternatively, the internal wall of the skirt at the first fixing area is provided with fixing profiles adapted for deformation against the external wall of the neck. Advantageously, the internal wall of the skirt at the first fixing area may be provided with blocking profiles adapted for accommodation under a shoulder inwards formed by the external wall of the neck. Anyway, whatever the profile of the internal wall of the skirt at the fist fixing area, the skirt may be radially deformed outwards in the intermediate free space without contacting or deteriorating the cladding hoop.

According to a practical embodiment, the cladding hoop comprises a cylindrical body inwardly defining the internal wall, wherein said body defines a lower end extending at least up to the free lower end of the skirt and an upper end forming a re-entering flap, wherein the hoop is only in contact with the ring at the second locking area and at the re-entering flap, the intermediate space extending between the second locking area and the re-entering flap. Thus, the hoop is fixed at its lower end through radial tightening and blocked at its lower end by the re-entering flap in abutment contact on the ring. Between these two ends, the hoop is not in contact with the ring.

BRIEF DESCRIPTION OF THE DRAWINGS

The invention will now be described in more detail with reference to the figures.

DETAILED DESCRIPTION

Figure 1:
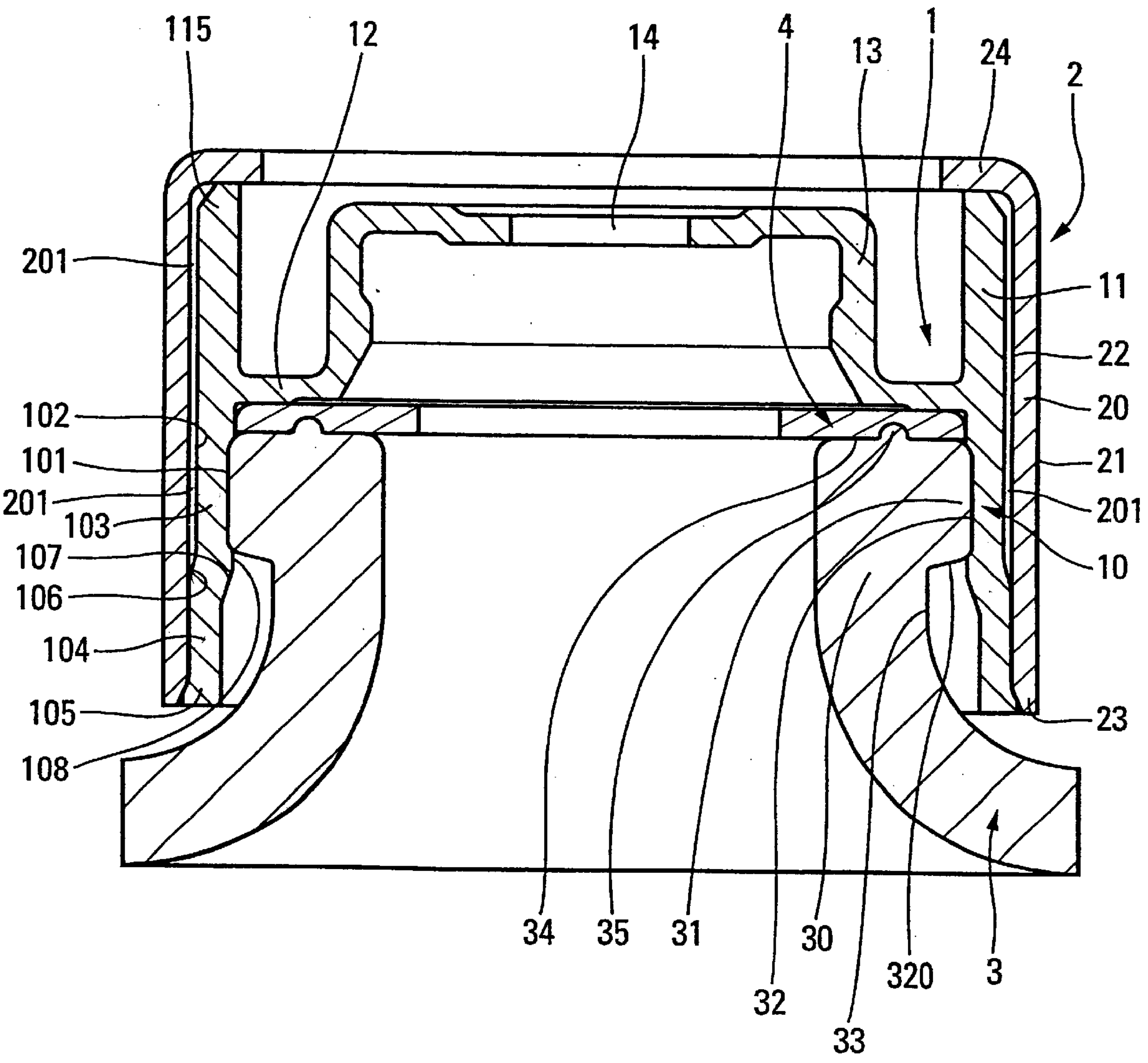
FIG. 1 is a vertical transverse sectional view through a fixing device according to an embodiment of the invention mounted on a container neck.

Container 3, the neck 30 of which is only illustrated, is a standard container forming a body for containing a fluid product, topped with the neck 30 which protrudes upwards and which defines an aperture through which the fluid product may be extracted from the container. The container's neck 30 is quite standard; it comprises an upper end 34, advantageously provided with an annular sealing bead 35. The neck 30 also forms a reinforced or thickened edge 31 which radially protrudes outwards so as to form a lower shoulder which is connected to a neck portion 33 with a reduced diameter. The reinforced edge 31 extends from the upper wall 34 up to the shoulder 33. The external wall of the thickened edge 31 and of the shoulder 33 will be designated as external wall 32. The external wall 32 at the thickened edge 31 may be perfectly cylindrical, circular, but may also include one or more locking profiles for enhancing the locking of said fixing device as to be seen hereafter.

The fixing device of the invention essentially comprises two constitutive components, i.e. a fixing ring 1 and a cladding hoop 2. The ring 1 is received inside the hoop in order to conceal it at least partly.

The fixing ring 1 comprises receiving means for holding a dispensing unit such as a pump or a valve. In FIG. 1, these receiving means are illustrated as a snap-on sleeve 13 into which a portion of the body of the pump or the valve is received through snapping-on. This sleeve 13 further defines a central aperture 14 through which extends the actuating rod of the pump or of the valve. The snap-on sleeve 13 defines the internal central portion of the fixing ring. This sleeve 13 is radially extended outwards through an annular plate 12 which may directly come into contact with the upper end 34 of neck 30, or come and press a neck gasket 4 on the upper end 34 of neck 30. The neck gasket 4, or the plate 12 itself, is strongly pressed against the sealing bead 35 and thus provides a seal at the neck of the container.

On its external periphery, plate 12 is connected to a skirt 10 which extends downwards in order to define a free lower end 105. In the embodiment illustrated in FIG. 1, a socket 11 also extends upwards from the external periphery of plate 12. This socket 11 extends in the continuation of skirt 10, and therefore may be considered as part of the skirt 10. Of course, other embodiments may be devised wherein the socket 11 does not extend exactly in the continuation of wall 10, but for example slightly set back inwardly. Even in this case, this may be termed as a stepped external skirt. The socket 11 therefore extends upwards and defines a free upper end 115.

Skirt 10 defines an external wall 102 and an internal wall 101 in its portion located below plate 12. The term of external wall 102 may also be applied to the external wall of socket 11. Skirt 10 extends around the neck 30 downwards so that its free lower end 105 is located well below the thickened edge 31 and may even in certain cases come into contact with the base of the neck.

The cladding hoop 2 of the fixing device is preferably made in metal, but it may also be made in plastic. The hoop 2 comprises a cylindrical body 20 defining an internal wall 22 and a visible external wall 21. Body 20 comprises a free lower end 23 and an upper end formed with a re-entering flap 24.

According to the invention, skirt 10 defines a first fixing area 103 at which the internal wall 101 of skirt 10 comes into contact with the external wall 32 of neck 30. Skirt 10 also comprises a second locking area 104 at which the external wall 102 of skirt 10 comes into tight contact with the internal wall 22 of hoop 2.

According to an interesting feature of the invention, the second locking area 104 is located below the first fixing area 103, when the fixing device is held in a vertical position as illustrated in FIG. 1 with the free lower end 105 of skirt 10 pointing downwards. When the fixing device is mounted on the container neck, as illustrated in the single figure, the second locking area 104 is located below the thickened edge 31, and even below the shoulder 320. As for the fist fixing area 103, it advantageously extends over the height of the thickened edge 31 and preferably below shoulder 320. The second blocking area 104 is located just above the free lower end 105 of the skirt; therefore, because of its position, the second locking area 104 has good deformability characteristics, which are in any case better than those of the skirt, for example at the plate 12 which stiffens and reinforces the skirt and reduces its deformability. This second locking area 104 is in tight contact with the internal wall 22 of the hoop 2, advantageously near its lower end 23. For example, this lower end 23 may be located at, or slightly below, the lower end 105 of skirt 10. The external wall of the locking area 104 may be cylindrical, advantageously circular, and have a smooth surface condition or provided with locking profiles 104' as more or less close, horizontal or vertical ribs, in order to enhance locking of the hoop as show in FIG. 2. Because of its position at the free lower end 105 of skirt 10, the locking area is easily deformable, so that the tight engagement in hoop 2 does not produce any notable deformation of the hoop, thus preventing any deterioration phenomenon through checking.

The internal wall of the locking area 104 advantageously has a greater diameter than the diameter of the thickened edge 31 of the neck so that there cannot be any tight contact with the neck at the locking area 104. On the contrary, the internal wall of the locking area 104 may serve as a guide and insertion wall in order to facilitate the placing of the ring on the container neck.

According to another interesting feature of the invention, an intermediate free space 201, is formed between the skirt 10 and hoop 2 at the first locking area 103. Advantageously, this intermediate space 201 extends over the whole of the height of the skirt, advantageously even at the socket 11, except at the second locking area 104. In any case, this intermediate space 201 extends at least at the first fixing area 103. To obtain this intermediate space 201, the first fixing area 103 has an external diameter different from that of the second locking area 104. The skirt may advantageously have the same diameter as that of the first fixing area 103 over the whole of its height except for the locking area 104. In the FIG. 1, it may be seen that the intermediate space 201 extends as a perfectly cylindrical ring between the cylindrical body 20 of hoop 2 and the cylindroidal external wall 102 of the skirt above the locking area 104. The first locking area 103 is connected to the second locking area 104 through an external shoulder 106 which widens outwards and downwards.

Upon mounting the hoop 2 on ring 1, the lower end 23 of the body 20 of hoop 2 first engages with the skirt portion formed by the socket 11 which has a smaller external diameter than the internal diameter of the hoop. Consequently there is no tight contact between the hoop and the ring up to the external shoulder 106. From this external shoulder 106, hoop 2 starts to engage with the locking area 104 and a certain thrust force is therefore required for engaging the hoop onto this locking area 104. A tight contact is thus achieved at this level. Engagement of hoop 2 with ring 1 continues until the re-entering flap 24 of the hoop comes into contact with the upper end 115 of socket 11. Hoop 2 is thus only in contact with the ring at the locking area 104 where radial tight contact is achieved and at its re-entering flap 24 resting on the socket 11. Between these two contact points, hoop 2 is not in contact with the ring but on the other hand defines the intermediate space 201. It may be noted that hoop 2 upon its mounting on ring 1 only undergoes stress at its lower end 23 and nowhere else: indeed, the major portion of body 20 of hoop 2 is never in contact with ring 1. Thus it is strictly impossible that hoop 2 be deteriorated through a checking phenomenon at the level where it is not in contact with the ring. Furthermore, because of the good deformability characteristics of the locking area from its position near the lower end of the skirt, any excessive deformation of the hoop is avoided.

The intermediate space 201 has the function of allowing the external wall 102 of skirt 10 to deform at the first fixing area 103 without damaging the hoop. Indeed, in this fixing system of the invention, the mounting of hoop 2 on ring 1 is intended to take place before the mounting of ring 1 on neck 30 of the container. Consequently, this intermediate space should be provided between the hoop and the ring in order to allow the ring to deform on the neck of the container.

In order to achieve proper fixing of the skirt on the neck, several techniques may be used which however all produce a momentary or permanent radial deformation of the external wall 102 of the skirt, radially outwards. The internal wall 101 of the skirt may for example be provided at its fixing area 103, with a snap-on bead 108 which radially protrudes inwards, and which is accommodated under the shoulder 320 of neck 30. This is a standard technique which we have described earlier. It should be noted that bead 108 is located at the fixing area 103, just above the internal shoulder 107. The bead 108 may radially deform outwards in the intermediate space 201 upon passing over the thickened edge 31 so as to be accommodated under shoulder 320.

Figure 2:
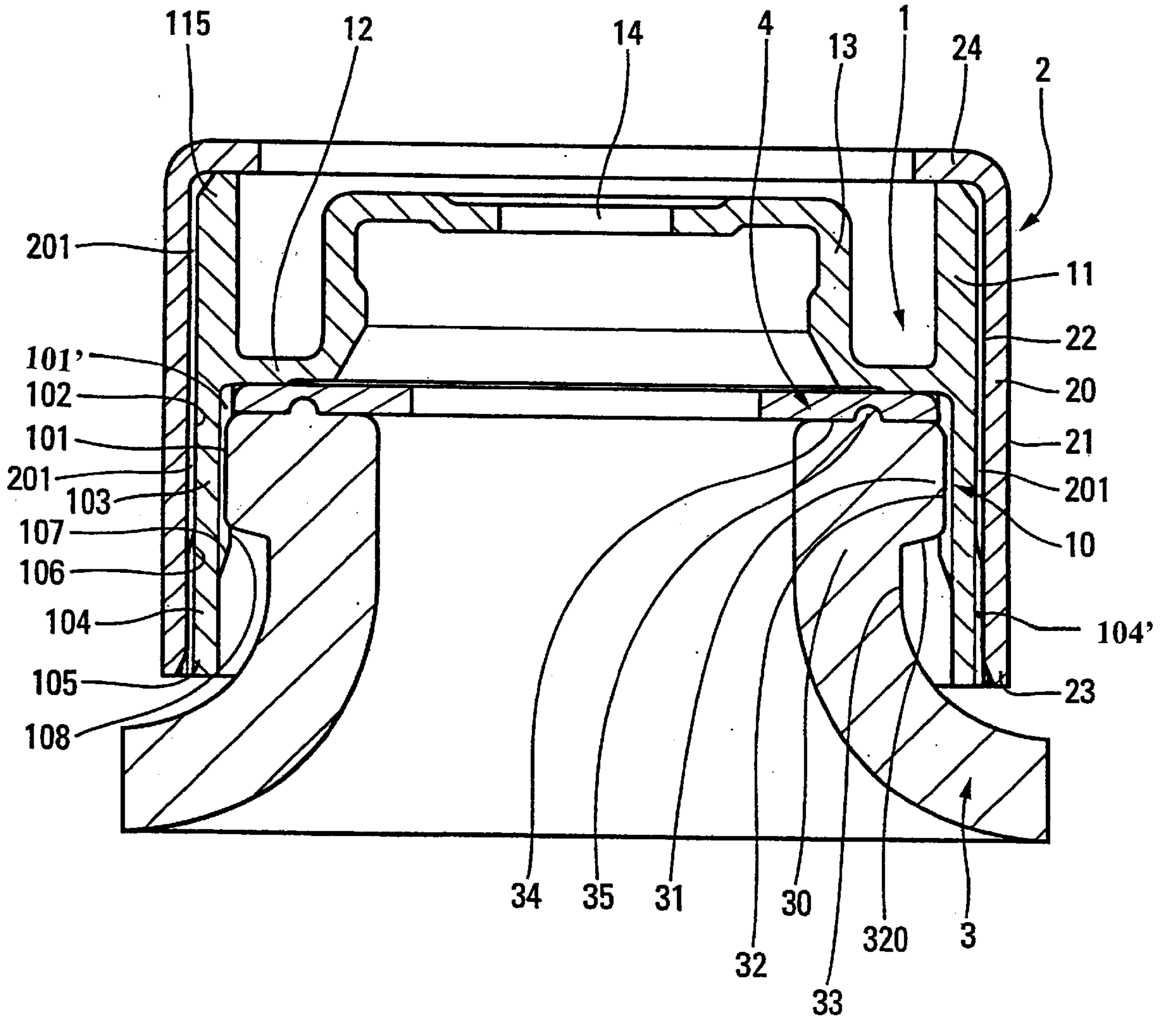
FIG. 2 is a vertical transverse sectional view through a fixing device according to another embodiment of the invention mounted on a container neck.

Alternatively or complementarily, the internal wall 101 of skirt 10 at the fixing area 103 may come into tight radial contact with the external wall 32 at the thickened edge 31. The internal wall 101 may be made perfectly cylindrical, circular, smooth, or even with the fixing profiles 101', for example as more or less spaced out vertical or horizontal ribs as shown in FIG. 2. With such radial tightness at the thickened edge 31, the snap-on bead 108 may be omitted. Other fixing techniques at the container neck may be devised which require external clearance for providing radial deformation outwards. Fixing techniques may even be devised which practically do not produce any radial outward deformation of the external wall 102 of the skirt. Even in this case, the intermediate space 101 is particularly advantageous, as it prevents radial tightness of the hoop on the ring over the whole of its height, which eliminates any risk of a checking phenomenon.

Locking the hoop through radial tightening, only at the lower end of the skirt, by leaving an intermediate space on the remainder of the hoop is therefore advantageous because it eliminates the risk of checking and in addition, it provides premounting of the hoop on the ring even with fixing techniques on the neck which produce a radial outward deformation of the external wall of the skirt.

What is claimed is:

1. A fixing device for fixing a dispensing unit on a neck (30) of a container (3) defining an external wall (32), wherein said device comprises:

a cladding hoop (2) defining an internal wall (22), and a fixing ring (1) forming receiving means (13) for holding the dispensing unit and a skirt (10) defining an internal wall (101), an external wall (102) and a free lower end (105), wherein said skirt further defines a first area (103) at which its internal wall (101) is intended to engage with the external wall (32) of the neck and a second area (104) at which its external wall (102) is tightly engaged with the internal wall (22) of the cladding hoop and spaced from the neck, characterized in that the second area (104) is located below the first area (103), substantially at the lower end (105) of the skirt; and wherein an intermediate free space (201) is formed between the skirt (10) and the hoop (2) at the first area (103).

2. The fixing device according to claim 1, wherein said intermediate free space (201) extends over the whole of the height of the skirt except at the second area (104).

3. The fixing device according to claim 1, wherein the second area has a greater external diameter than that of the first area.

4. The fixing device according to claim 3, wherein an external outward shoulder (106) connects the first area (103) to the second area (104).

5. The fixing device according to claim 1, wherein the external wall (102) of the skirt at the second area (104) is substantially cylindrical.

6. The fixing device according to claim 1, wherein the external wall (102) of the skirt at the second area (104) is provided with deformable locking profiles against the internal wall (22) of the hoop (2).

7. The fixing device according to claim 6, wherein the internal wall (22) of the hoop is in localized contact with the second area at the deformable locking profiles.

8. The fixing device according to claim 1, wherein the internal wall (22) of the hoop is in continuous contact with the second area over the whole periphery.

9. The fixing device according to claim 1, wherein the external wall (102) of the skirt at the first area (104) is substantially cylindrical.

10. The fixing device according to claim 1, wherein the internal wall (101) of the skirt at the first area (103) is substantially cylindrical and has, before its mounting on the neck, a smaller internal diameter than the external diameter of the neck, so as to provide fixing through radial tightening.

11. The fixing device according to claim 1, wherein the internal wall (101) of the skirt at the first area (103) is provided with fixing profiles adapted for deformation against the external wall (32) of the neck.

12. The fixing device according to claim 1, wherein the internal wall (101) of the skirt at the first area (103) is provided with locking profiles (108) adapted for accommodation under an inward shoulder (33) formed by the external wall (32) of the neck.

13. The fixing device according to claim 1, wherein the internal wall of the skirt at the first area is provided with a snap-on bead that radially protrudes inwardly and that is configured to snap-on under an inward shoulder formed by the external wall of the neck.

14. The fixing device according to claim 1, wherein an external outward shoulder (106) connects the first area (103) to the second area (104).

15. A fixing device for fixing a dispensing unit on a neck (30) of a container (3) defining an external wall (32), wherein said device comprises:

a cladding hoop (2) defining an internal wall (22), and a fixing ring (1) forming receiving means (13) for holding the dispensing unit and a skirt (10) defining an internal wall (101), an external wall (102) and a free lower end (105), wherein said skirt further defines a first area (103) at which its internal wall (101) is intended to engage with the external wall (32) of the neck and a second area (104) at which its external wall (102) is tightly engaged with the internal wall (22) of the cladding hoop and spaced from the neck, characterized in that the second area (104) is located below the first area (103), substantially at the lower end (105) of the skirt; and wherein the second area has a greater internal diameter than that of the first area.

16. The fixing device according to claim 15, wherein an internal shoulder (107) connects the first area (103) to the second area (104).

17. The fixing device according to claim 15, wherein the external wall (102) of the skirt at the second area (104) is substantially cylindrical.

18. The fixing device according to claim 15, wherein the external wall (102) of the skirt at the second area (104) is provided with deformable locking profiles against the internal wall (22) of the hoop (2).

19. The fixing device according to claim 18, wherein the internal wall (22) of the hoop is in localized contact with the second area at the deformable locking profiles.

20. The fixing device according to claim 15, wherein the internal wall (22) of the hoop is in continuous contact with the second area over the whole periphery.

21. The fixing device according to claim 15, wherein the external wall (102) of the skirt at the first area (104) is substantially cylindrical.

22. The fixing device according to claim 15, wherein the internal wall (101) of the skirt at the first area (103) is substantially cylindrical and has, before its mounting on the neck, a smaller internal diameter than the external diameter of the neck, so as to provide fixing through radial tightening.

23. The fixing device according to claim 15, wherein the internal wall (101) of the skirt at the first area (103) is provided with fixing profiles adapted for deformation against the external wall (32) of the neck.

24. The fixing device according to claim 15, wherein the internal wall (101) of the skirt at the first area (103) is provided with locking profiles (108) adapted for accommodation under an inward shoulder (33) formed by the external wall (32) of the neck adapted for accommodation under an inward shoulder (33) formed by the external wall (32) of the neck.

25. A fixing device for fixing a dispensing unit on a neck (30) of a container (3) defining an external wall (32), wherein said device comprises:

a cladding hoop (2) defining an internal wall (22), and a fixing ring (1) forming receiving means (13) for holding the dispensing unit and a skirt (10) defining an internal wall (101), an external wall (102) and a free lower end (105), wherein said skirt further defines a first area (103) at which its internal wall (101) is intended to engage with the external wall (32) of the neck and a second area (104) at which its external wall (102) is tightly engaged with the internal wall (22) of the cladding hoop and spaced from the neck, characterized in that the second area (104) is located below the first area (103), substantially at the lower end (105) of the skirt; and wherein the cladding hoop (2) comprises a cylindrical body (20) inwardly defining the internal wall (22), wherein said body (20) defines a lower end (23) extending at least up to the free lower end (105) of the skirt and an upper end forming a re-entering flap (24), wherein the hoop is only in contact with the ring at the second area and the re-entering flap (24), the intermediate space (201) extending between the second locking area and the re-entering flap.

26. A container, comprising:

a neck having a neck external wall;

a dispensing unit;

a fixing device that fixes the dispensing unit on the neck, the fixing device further comprising:

a cladding hoop having a hoop internal wall;

a fixing ring that holds the dispensing unit; and a skirt having a skirt internal wall, a skirt external wall, and a free lower end;

wherein the skirt further has a first area at which the skirt internal wall is engaged with the neck external wall, and a second area at which the skirt external wall is tightly engaged with the hoop internal wall;

wherein the second area is spaced radially outward from the neck; and wherein the second area is located below the first area, substantially at the free lower end of the skirt; and wherein the second area has an internal diameter that is larger than an internal diameter of the first area.

* * * * *